United States Patent
Papoutsakis et al.

(10) Patent No.: US 7,761,485 B2
(45) Date of Patent: Jul. 20, 2010

(54) DISTRIBUTED DATABASE

(75) Inventors: Emmanuel A. Papoutsakis, Vancouver (CA); Jonathan Back, Vancouver (CA)

(73) Assignee: Zeugma Systems Inc., Richmond (CA)

( * ) Notice: Subject to any disclaimer, the term of this patent is extended or adjusted under 35 U.S.C. 154(b) by 297 days.

(21) Appl. No.: 11/586,770

(22) Filed: Oct. 25, 2006

(65) Prior Publication Data

US 2008/0104085 A1 May 1, 2008

(51) Int. Cl.
*G06F 7/00* (2006.01)
*G06F 17/30* (2006.01)

(52) U.S. Cl. ...................... 707/812; 707/795
(58) Field of Classification Search .................. None
See application file for complete search history.

(56) References Cited

U.S. PATENT DOCUMENTS

| | | | |
|---|---|---|---|
| 5,117,350 A * | 5/1992 | Parrish et al. | 711/1 |
| 5,335,346 A | 8/1994 | Fabbio | |
| 5,495,608 A | 2/1996 | Antoshenkov | |
| 5,649,102 A * | 7/1997 | Yamauchi et al. | 709/213 |
| 5,680,618 A | 10/1997 | Freund | |
| 5,706,455 A * | 1/1998 | Benton et al. | 715/853 |
| 5,727,197 A | 3/1998 | Burgess et al. | |
| 5,809,495 A * | 9/1998 | Loaiza | 707/2 |
| 5,893,097 A * | 4/1999 | Hayata et al. | 707/10 |
| 5,913,029 A * | 6/1999 | Shostak | 709/203 |
| 5,974,418 A | 10/1999 | Blinn et al. | |
| 5,987,506 A * | 11/1999 | Carter et al. | 709/213 |
| 5,991,758 A | 11/1999 | Ellard | |
| 6,058,423 A * | 5/2000 | Factor | 709/226 |
| 6,125,209 A * | 9/2000 | Dorricott | 382/233 |
| 6,219,672 B1 * | 4/2001 | Hirayama et al. | 707/102 |
| 6,266,660 B1 | 7/2001 | Liu et al. | |
| 6,266,745 B1 * | 7/2001 | de Backer et al. | 711/147 |
| 6,295,585 B1 * | 9/2001 | Gillett et al. | 711/148 |
| 6,314,114 B1 * | 11/2001 | Coyle et al. | 370/503 |
| 6,457,007 B1 * | 9/2002 | Kikuchi et al. | 707/10 |
| 6,499,033 B1 | 12/2002 | Vagnozzi | |
| 6,571,252 B1 * | 5/2003 | Mukherjee | 707/103 R |
| 6,601,072 B1 | 7/2003 | Gerken, III | |
| 6,931,409 B2 | 8/2005 | Redpath | |
| 7,152,060 B2 | 12/2006 | Borthwick et al. | |

(Continued)

FOREIGN PATENT DOCUMENTS

WO  WO 95/31769  11/1995

(Continued)

OTHER PUBLICATIONS

Event ordering in a shared memory distributed system, Gunaseelan et al (IEEE' 1993).*

(Continued)

*Primary Examiner*—Pierre M Vital
*Assistant Examiner*—Augustine Obisesan
(74) *Attorney, Agent, or Firm*—Blakely Sokoloff Taylor & Zafman LLP

(57) ABSTRACT

A technique for storing a plurality of data records in a database. Client processes link to the database to access the data records of the database. Each client process has a specified scope. The scope defines to which of the data records within the database each of the client processes has access.

32 Claims, 14 Drawing Sheets

U.S. PATENT DOCUMENTS

| | | | |
|---|---|---|---|
| 7,171,419 | B2 | 1/2007 | Redpath |
| 7,401,338 | B1 | 7/2008 | Bowen et al. |
| 7,508,764 | B2 | 3/2009 | Back et al. |
| 7,606,147 | B2 | 10/2009 | Luft et al. |
| 2002/0016814 | A1 | 2/2002 | Convent et al. |
| 2002/0049759 | A1* | 4/2002 | Christensen ................ 707/10 |
| 2002/0138353 | A1 | 9/2002 | Schreiber et al. |
| 2003/0154202 | A1* | 8/2003 | Dinker et al. ............... 707/100 |
| 2004/0078569 | A1* | 4/2004 | Hotti ......................... 713/165 |
| 2004/0139070 | A1 | 7/2004 | Dysart et al. |
| 2004/0181537 | A1 | 9/2004 | Chawla et al. |
| 2004/0205692 | A1 | 10/2004 | Robinson |
| 2005/0091231 | A1 | 4/2005 | Pal et al. |
| 2005/0273452 | A1 | 12/2005 | Mollory et al. |
| 2006/0112107 | A1* | 5/2006 | Jones ........................ 707/10 |
| 2006/0143525 | A1* | 6/2006 | Kilian ........................ 714/31 |
| 2006/0233101 | A1 | 10/2006 | Luft et al. |
| 2007/0058629 | A1 | 3/2007 | Luft |
| 2007/0061433 | A1 | 3/2007 | Reynolds et al. |
| 2007/0100834 | A1* | 5/2007 | Landry et al. ................ 707/10 |

FOREIGN PATENT DOCUMENTS

| | | |
|---|---|---|
| WO | WO 99/33002 | 7/1999 |
| WO | WO 02/075600 A1 | 9/2002 |
| WO | WO 02/092260 A1 | 11/2002 |

OTHER PUBLICATIONS

Distributed shared memory in a loosely coupled distributed system, Fleisch (ACM' 1988).*

Algorithm implementing distributed shared memory, Stumm et al (IEEE' 1990).*

Ahn, Jung-Ho et al., "Index set: A practical indexing scheme for object database systems", Data & Knowledge Engineering, 2000, vol. 33, pp. 199-217.

"Serialization," Wikipedia, the free encyclopedia, http://en.wikipedia.org/wiki/Object_serialization (retrieved on Jul. 3, 2006), 8 pages.

* cited by examiner

DISTRIBUTED DATABASE

TECHNICAL FIELD

This disclosure relates generally to software, and in particular but not exclusively, relates to databases.

BACKGROUND INFORMATION

FIG. 1 illustrates a conventional database system 100 including a database 105 and a database client 110. As illustrated, database 105 stores separate internal keys indexed to each record or data buffer. To retrieve a particular record, database client 110 provides a key 115 to database 105, which in turn searches on it internal keys. If a match is found, then database 105 will return a record 120 indexed to the internal key that matched key 115 provided. To write data buffers or records into database 105, database client 110 may reference a database ("DB") schema 125, which includes a description of the internal structure or directory system of database 105. In short, schema 125 provides database client 110 with the knowledge necessary to access and utilize database 105.

Since database 105 merely indexes data buffers or records to internal keys, the knowledge and complexity required to run higher level queries on database 105 is pushed onto application developers of database client 110. Furthermore, since the internal keys themselves are not part of the useful data stored by database client 110, but rather independently generated values used simply for retrieving records or data buffers, the internal keys consume additional memory resources within database 105.

In an alternative conventional database system, database 105 itself may contain knowledge of the internal representation of the data buffers or records it stores to perform its own complex queries and indexing. This alternative embodiment pushes the complexities of indexing and queries onto the database developer; however, does so at the expense of performance by adding a layer of abstraction between the records stored and the database clients accessing the records.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for distributed database are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
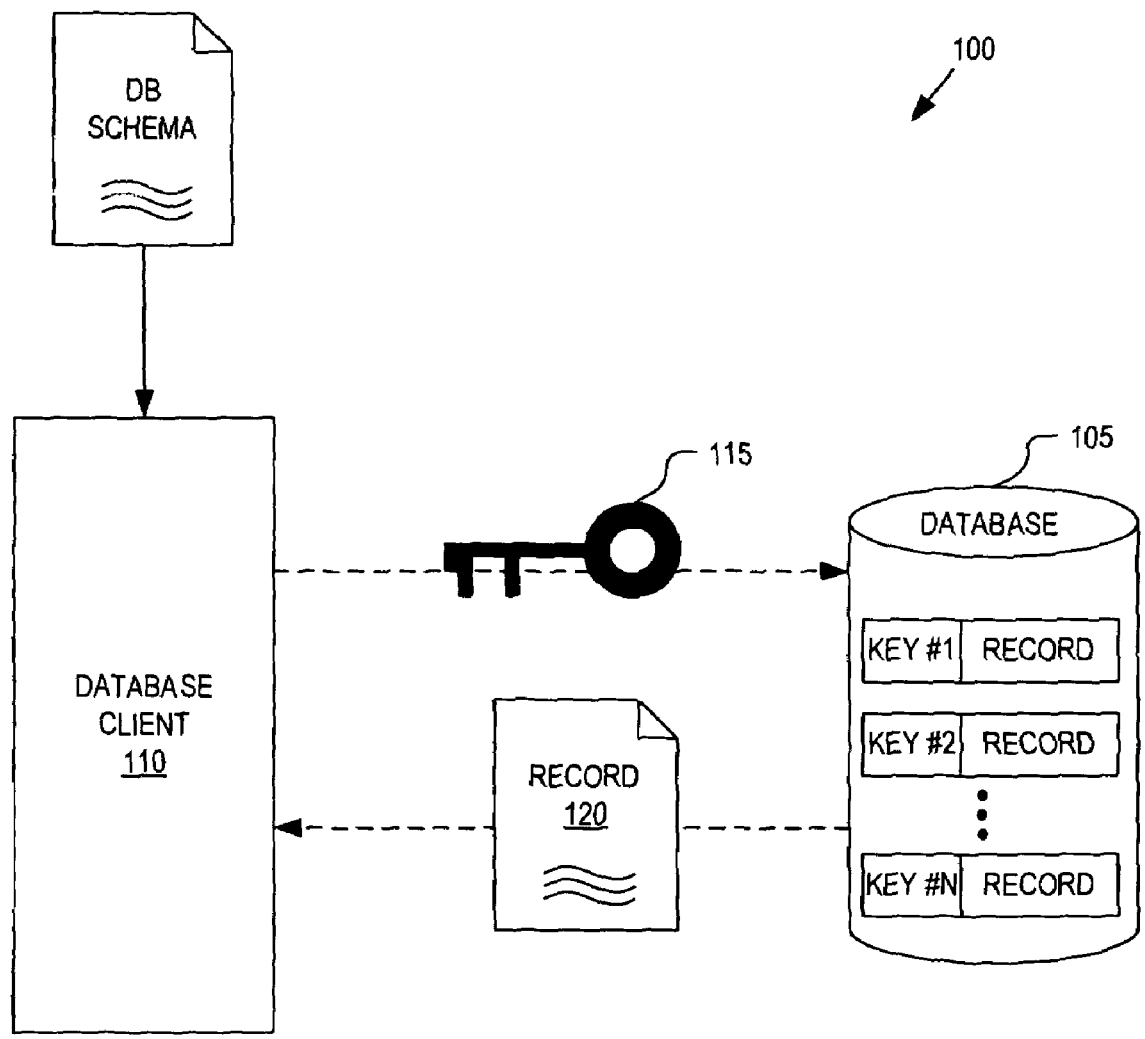
FIG. 1 (PRIOR ART) illustrates a conventional database system.
Figure 2:
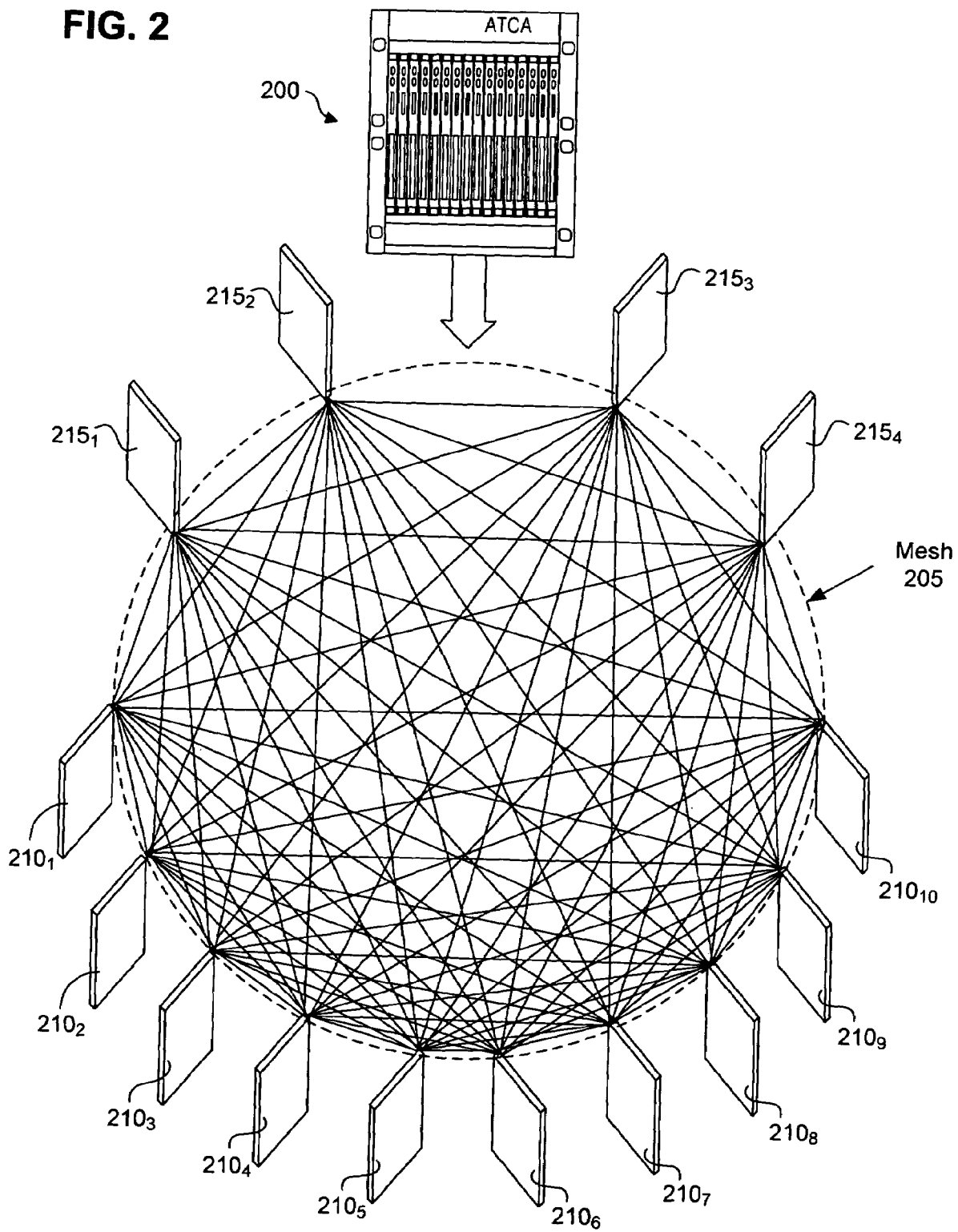
FIG. 2 is a schematic diagram illustrating a mesh interconnect between traffic and compute modules of a network service element across which a database may be distributed, in accordance with an embodiment of the invention.

FIG. 2 is a schematic diagram illustrating a mesh interconnect between traffic and compute modules of a network service element 200 across which a database may be distributed, in accordance with an embodiment of the invention. The illustrated embodiment of network services element 200 includes a mesh interconnect 205 coupling traffic modules 210 and compute modules 215. Each of the traffic and compute modules 210 and 215 provide the processing power to implement packet processing, routing, and other functionality. In one embodiment, network service element 200 is a service node intended to be connected between two or more networks (e.g., between core networks providing services and aggregation networks providing access to clients consuming the services), which may implement additional functionality such as traffic shaping, guarantee quality of service ("QoS"), admission protocols, or otherwise.

In the illustrated embodiment, network service element 200 is implemented using an Advanced Telecommunication and Computing Architecture ("ATCA") chassis. Mesh interconnect 205 may provide cross-connectivity between traffic and compute modules 210 and 215 with the ATCA backplane. The illustrated configuration includes four compute modules $215_{1-4}$, and 10 traffic modules $210_{1-10}$, with one of the compute modules being provisioned to provide operations, administration, maintenance and provisioning functionality ("OAMP") functions. As depicted by interconnection mesh 205, each module is communicatively-coupled with every other module under the control of fabric switching operations performed by each module's fabric switch. In one embodiment, mesh interconnect 205 provides a 10 Gbps connection between each pair of modules, with an aggregate bandwidth of 280 Gbps.

In the illustrated embodiments, network service element 200 is implemented using a distributed architecture, wherein various processor and memory resources are distributed across multiple modules. To scale a system, one simply adds another module (e.g., blade). The system is further enabled to dynamically allocate processor tasks, and to automatically perform fail-over operations in response to a module failure or the like. Furthermore, under an ATCA implementation, modules may be hot-swapped without taking the system down, thus supporting dynamic scaling. Although embodiments of the distributed database disclosed here are described in connection with ATCA architecture and mesh interconnect 205, it should be appreciated that other hardware architecture and configurations may used and further that the software components of the distributed database may be installed and executed on other hardware systems.

Figures 3A, 3B:
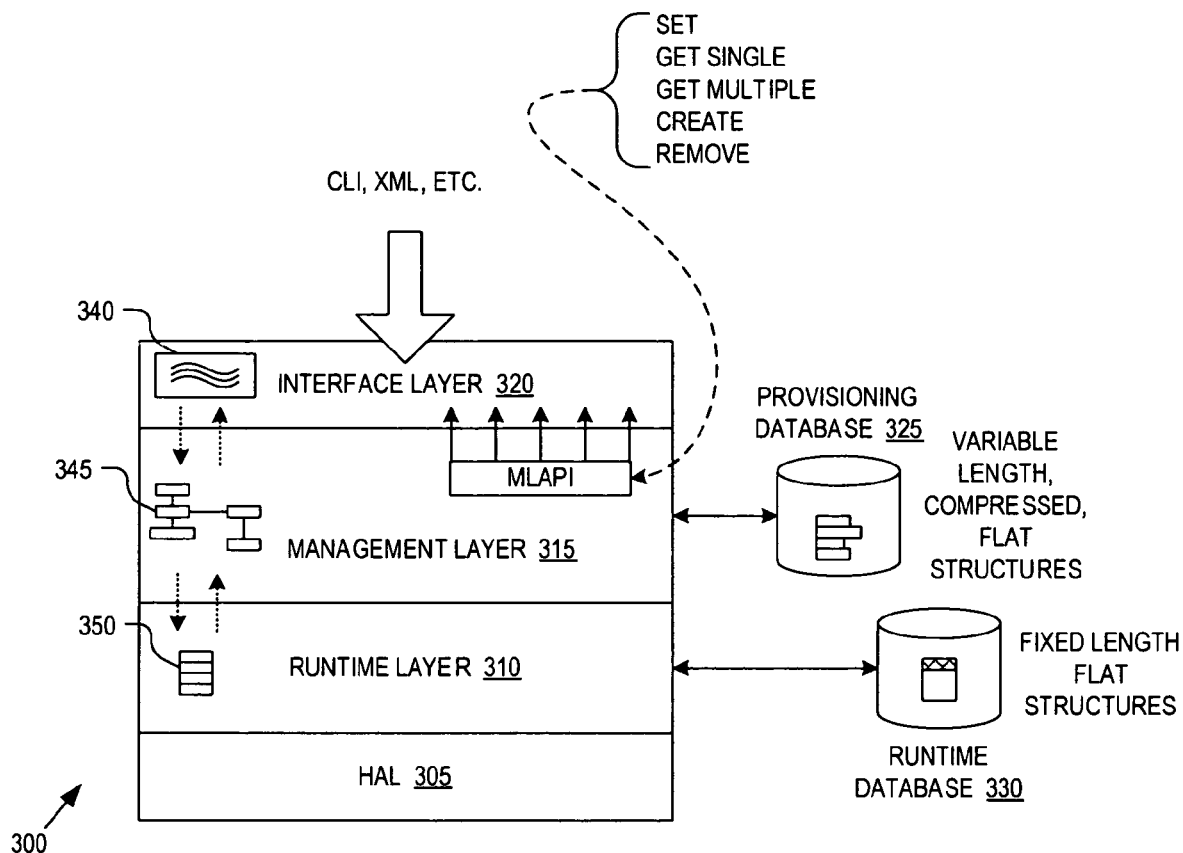
FIG. 3A is a block diagram illustrating a layered software stack executing on a module of a network service element, in accordance with an embodiment of the invention.
FIG. 3B is a table illustrating which layers of a layered software stack execute on an OAMP module, a compute module, or a traffic module of a network service element, in accordance with an embodiment of the invention.

FIG. 3A is a block diagram illustrating a layered software stack 300 executing on a module of network service element 200, in accordance with an embodiment of the invention. The illustrated embodiment of layered software stack 300 includes a hardware abstraction layer ("HAL") 305, a runtime layer 310, a management layer 315, and an interface layer 320.

HAL 305 abstracts the underlying hardware resources to the software layers above and may include various device drivers, a kernel, software buffers, or the like. Runtime layer 310 is used to maintain dynamic state information for the modules of network service node 200, which may be in a state of flux during operation. For example, routing demons may execute in runtime layer 310 to setup and tear down route changes, to receive and process open shortest path first ("OSPF") protocol packets, or service other dynamic change requests coming up from HAL 305.

Management layer 315 services application programming interface ("API") calls from interface layer 320 and translates the calls into data, typically to be stored into a provisioning database 325 or occasionally into a runtime database 330. The APIs are published into interface layer 320 via a management layer API ("MLAPI"), which may provide a variety of APIs for accessing the databases. For example, the MLAPI may publish five APIs into interface layer 320 including a set API, a get API, a get multiple API, a create API, and a remove API. Management layer 315 typically facilities the provisioning of static attributes assigned to the modules of network service node 200. For example, static attributes may include port assignments, the existence (or lack thereof) of a module in a slot, power settings, a registry of applications executing on each module, and the like.

Finally, interface layer 320 provides an access layer to enable a user (e.g., network administrator or other Information Technology ("IT") technician) to interface with network service element 200 and the lower layers of layered software stack 300. For example, the user may invoke any of the APIs published by the MLAPI using a command line interface ("CLI") to get (e.g., retrieve) one or more records stored in provisioning database 325 or runtime database 330, create a new record, remove (e.g., delete) an existing record therefrom, or set an attribute of an object existing in lower layers of layered software stack 300. In other cases, the interface layer 320 may enable the user to push user/data files (e.g., extensible markup language ("XML") files, etc.) down to the lower layers using various converters.

As mentioned, interface layer 320 enables a user to push in data files 340 from external sources. Data files 340 may be XML files, compiled C object, compiled C++ objects, compiled C# objects, compiled Java objects, or otherwise. As a data file 340 is pushed down to management layer 315, layered software stack 300 may convert data file 340 into a serializable object 345. A serializable object ("SO") is a software object that lends itself well to serialization and which is typically a complex of linked memory structures. As SO 345 is pushed further down to runtime layer 310, SO 345 may be converted into a flat structure 350. Flat structure 350 typically is a fixed length contiguous memory structure which may be quickly and easy manipulated in memory and therefore well suited for the high speed, dynamic environment of runtime layer 310.

Provisioning database 325 may be used to store provisioning data for setting static or semi-static attributes of network service element 200, while runtime database 330 may be used to store runtime data arriving on datapaths rising up from HAL 305. In one embodiment, provisioning database 325 may convert SO 345 into variable length, compressed, flat memory structures, prior to storing SO 345, while runtime database 330 may simply store flat structure 350 as a fixed length, uncompressed, flat structure. Since runtime layer 310 manages high speed, dynamically changing events, it is reasonable to tradeoff memory consumption (e.g., fixed length, uncompress structures) in exchange for low latency, high speed access to runtime database 330. In contrast, management layer 315 typically manages static or semi-static attributes; therefore compressed, variable length structures are advantages, even at the expense of incurring some processing overhead related to accessing variable length structures.

FIG. 3B is a table illustrating how software components of layered software stack 300 may be distributed across multiple modules of network service element 200, in accordance with an embodiment of the invention. As illustrated, an OAMP module (which may be one of compute modules 215 selected to implement OAMP functionality) includes runtime layer 310, management layer 315, and interface layer 320. In contrast, ordinary compute modules 215 and traffic modules 210 may only execute runtime layer 310. Provisioning database 325 and runtime database 330 each represent a distributed database that may be spread over multiple processing modules (e.g., compute modules 215 and/or traffic modules 210) of network service element 200. The distributed database may be evenly distributed over the processing modules or disproportionately distributed (e.g., majority of the data records stored within memory attached to compute modules 210 or the OAMP compute module 210).

Figure 4:
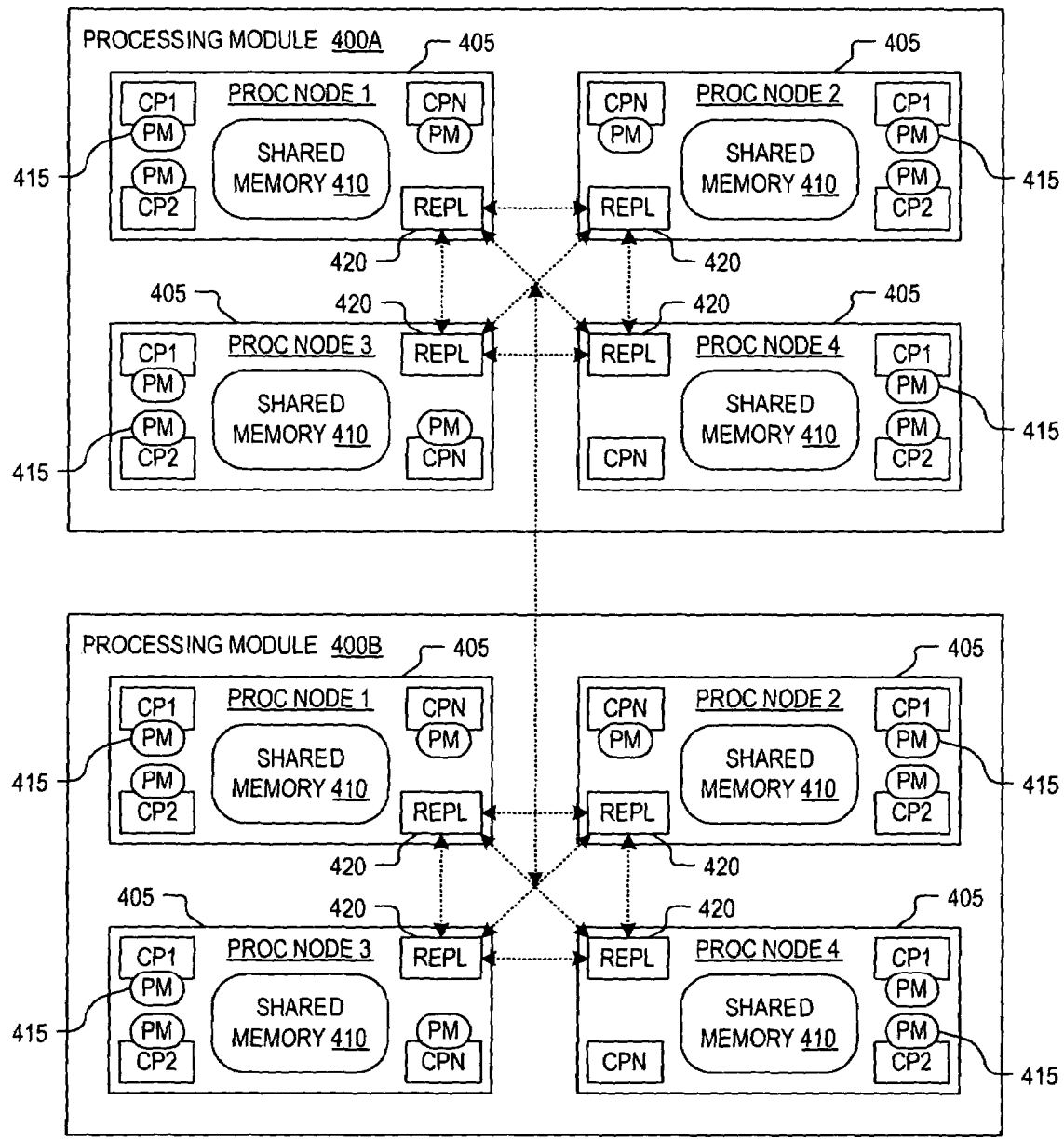
FIG. 4 is a functional block diagram illustrating processing modules each including multiple processing nodes supporting a distributed database of shared and local memory regions, in accordance with an embodiment of the invention.

FIG. 4 is a functional block diagram illustrating processing modules 400A and 400B each including multiple processing nodes 405 supporting a distributed database, in accordance with an embodiment of the invention. Processing modules 400 may represent compute modules 215 or traffic modules 210. The distributed database includes data records stored in shared memory regions 410, process memory regions 415 (only some are labeled so as not to clutter the drawing), and replication clients 420. Each processing node 405 may include one or more client processes (e.g., CP1, CP2 . . . , CPN) executing thereon. The client processes generate and maintain their own process memory region 415 and link to a particular shared memory region 410 within their processing node 405. Although shared memory regions 410 are illustrated as a single entity on each processing node 405, it should be appreciated that shared memory regions 410 on each processing node 405 may represent a plurality of individual shared memory regions residing on or coupled to each processing node 405.

In one embodiment, replication clients 420 reside on each processing node 405 and link to a corresponding shared memory region 410. Replication clients 420 passively and independently inspect the data records stored within their associated shared memory region 410 and determine whether data records are designated for replication into other shared memory regions 410. A designation of replication may include a designation for replication to other processing nodes 405 within a given processing module 400, a designation for replication to other processing modules 400, or otherwise. In one embodiment, if a replication client 420 determines that a particular data record is designated for replication to another shared memory region 410, the data record is passed onto the appropriate replication client 420 for coping into that replication client's linked shared memory region 410.

Figure 5:
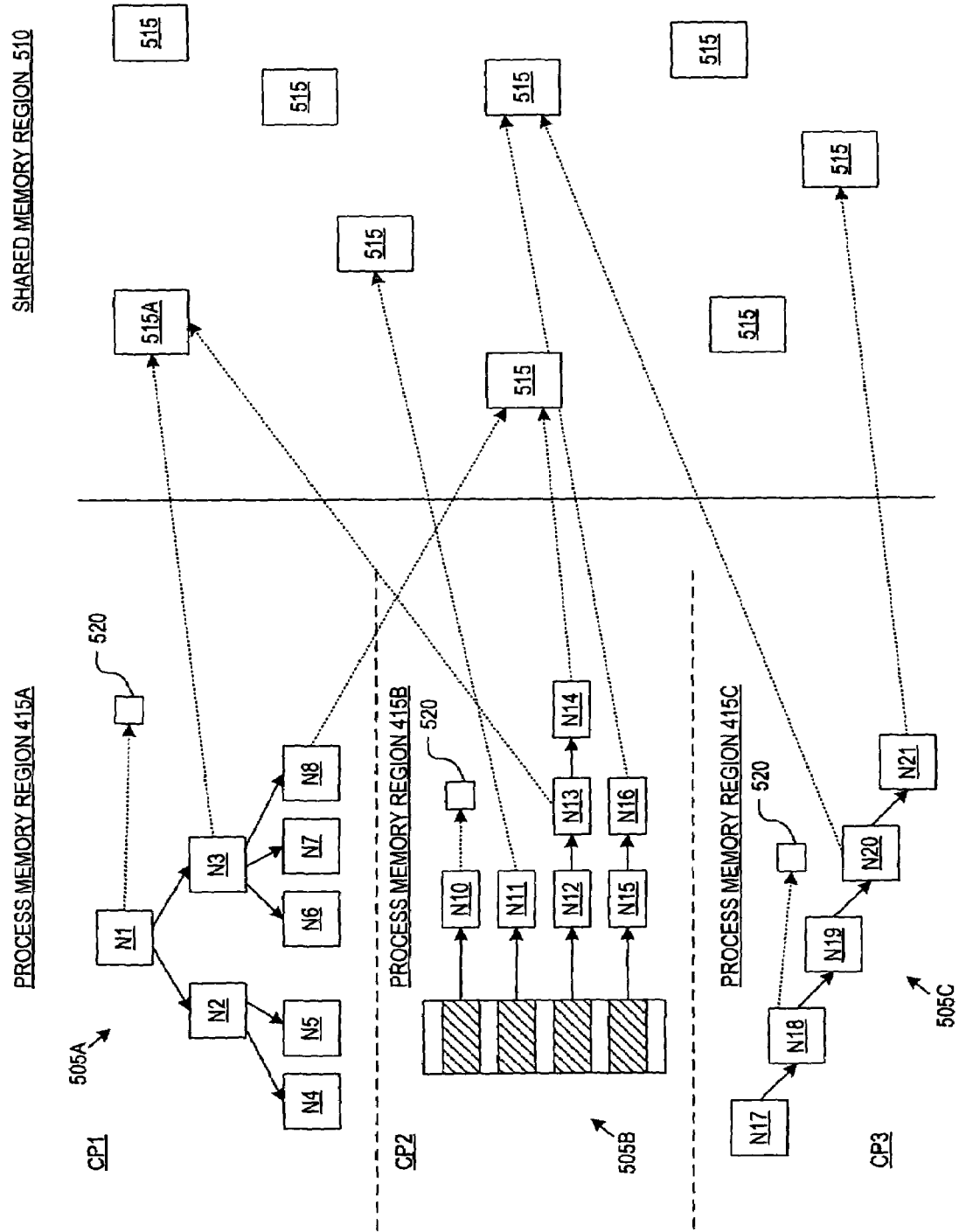
FIG. 5 is a functional block diagram illustrating how different abstract data structures residing in process memory regions of multiple client processes can link to subsets of data records stored in a shared memory region, in accordance with an embodiment of the invention.

FIG. 5 is a functional block diagram illustrating how different abstract data structures residing in process memory regions of multiple client processes can link to subsets of data records stored in a shared memory region, in accordance with an embodiment of the invention. The illustrated embodiment of FIG. 5 includes abstract data structures ("ADS") 505A, 505B, and 505C (collectively ADS 505) residing within the process memory regions 415A, 415B, and 415C of three client processes CP1, CP2, and CP3, respectively. Although not necessary, in the illustrated embodiment all three ADS 505 link to the same shared memory region 510. For example, FIG. 5 may illustrate three client processes executing on processing node 1 of processing module 400A, while shared memory region 510 corresponds to shared memory region 410 within processing node 1 of processing module 400A.

Figure 6:
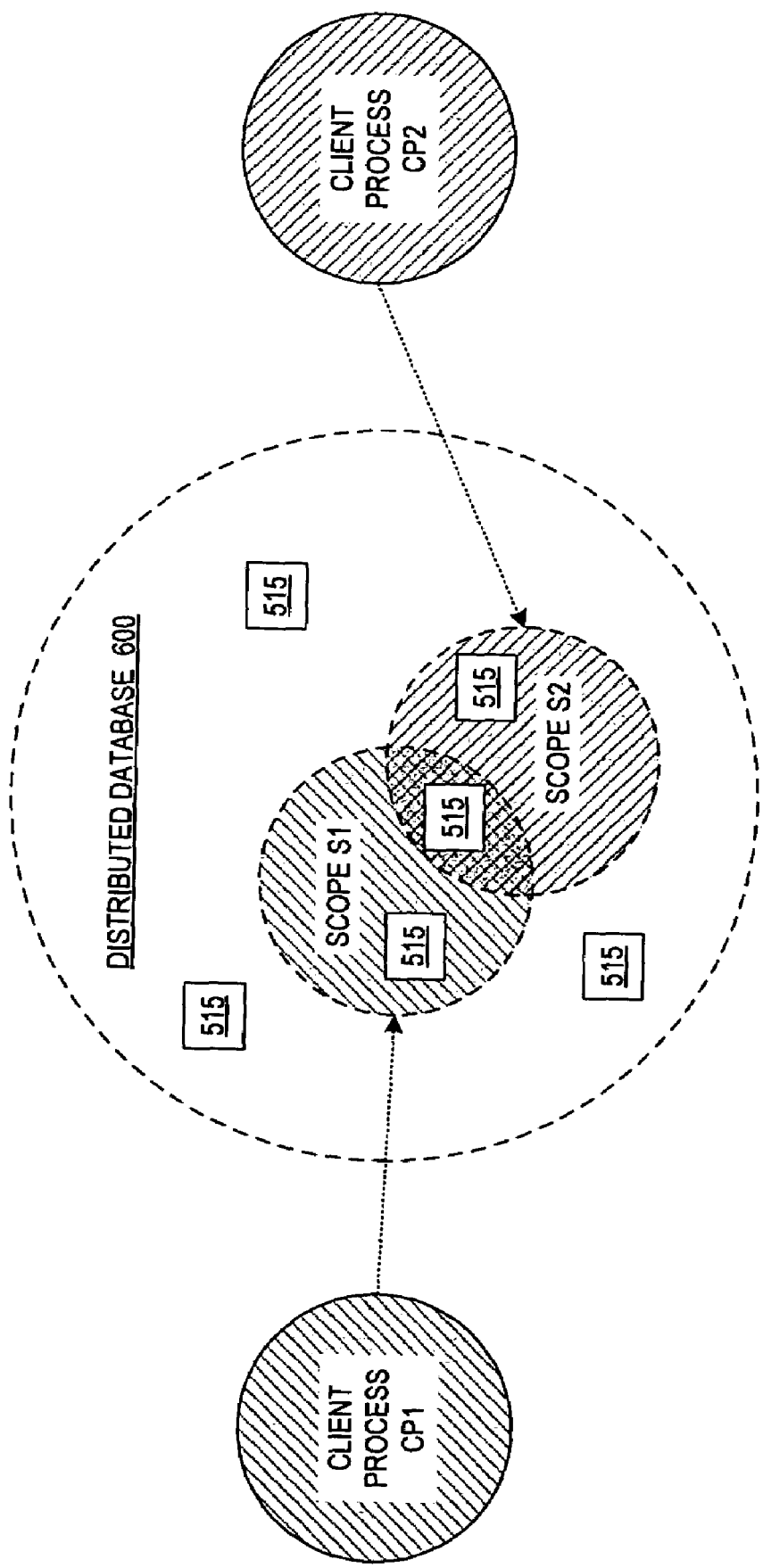
FIG. 6 is a diagram illustrating how different client processes may have different scopes within the distributed database, in accordance with an embodiment of the invention.

Each ADS 505 may link to the same or a different subset of data records 515 within shared memory region 510. The subset of data records 515 to which each ADS 505 links delineates the scope of that ADS 505 and its corresponding client process. FIG. 6 symbolically illustrates how different client processes may have different scopes within distributed database 600. As previously mentioned, distributed database 600 may represent the collection of all data records stored in all shared memory regions 410 and process memory regions 415 distributed across processing modules 400. In the illustrated example, client process CP1 has limited access to a subset of the data records falling within its corresponding scope S1. Similarly, client process CP2 has limited access to a subset of data records falling within its corresponding scope S2. Scopes S1 and S2 may overlap, such that some data records 515 fall within the scope of both client processes CP1 and CP2. Correspondingly, there may be other data records 515 that fall outside of the scopes of both client processes CP1 and CP2. In one embodiment, data records 515 that fall outside of scope of client processes CP1 and CP2 are not only inaccessible to client processes CP1 and CP2, but hidden therefrom, as well.

Returning to FIG. 5, each ADS 505 may use a different type of abstract data structure to organize, reference, and access data records 515 falling within its scope. ADS 505 may also organize and link to local data records (e.g., data record 520) maintained in process memory regions 415. For example, ADS 505A represents a hierarchical tree structure. The hierarchical tree structure includes a collection of organized nodes (e.g., nodes N1-N8) each including a pointer or key(s) for identifying and accessing its corresponding data records 515 or 520. ADS 505B represents a hash table structure. The hash table structure includes hash values indexed to nodes (e.g., nodes N10-N16), which in turn include pointers or keys for identifying and accessing corresponding data records 515 or 520. ADS 505C represents a link list structure. The link list structure includes linked nodes (e.g., nodes N17-N21) each including a pointer or key(s) for identifying and accessing corresponding data records 515 or 520.

Other known organizational or hierarchical structures may be implemented, as well. The particular ADS 505 selected for use with each client process may vary depending upon the purpose and tasks associated with each client process. By enabling each client process to select the organizational structure by which it links to data records 515 (or 520), each client process can have its own unique perspective on the very same shared memory region 510. Even client processes with substantially overlapping scopes may view shared memory region 510 in a very different manner that is uniquely tailored for its execution purpose. Furthermore, although FIG. 5 illustrates each client process CP1, CP2, and CP3 as including only a single ADS 505, it should be appreciated that each client process may include multiple different ADS 505 to provide primary and secondary access mechanisms into shared memory region 510.

Figure 7:
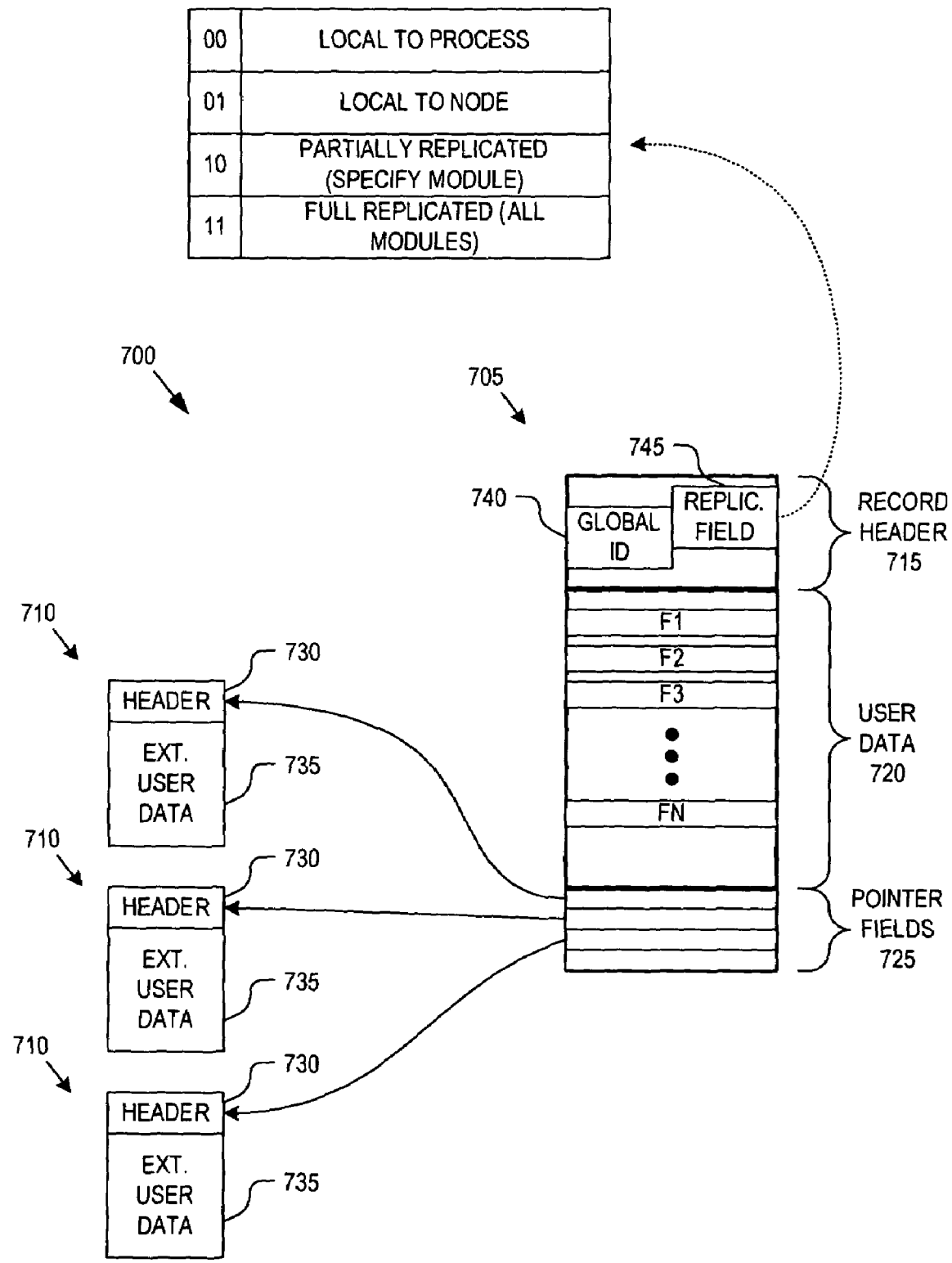
FIG. 7 is a block diagram illustrating an example format of a data record, in accordance with an embodiment of the invention.

FIG. 7 is a block diagram illustrating an example data record 700, in accordance with an embodiment of the invention. Data record 700 represents one possible format for data records 515 or 520. The illustrate embodiment of data record 700 includes a base portion 705 and optional add-on portions 710. Base portion 705 includes a record header 715, user data 720, and pointer fields 725. Add-on portions 710 each include an add-on header 730 and extended user data 735.

The illustrated embodiment of record header 715 may include a number header fields including a global identifier ("ID") 740 and a replication field 745. In one embodiment, global ID 740 is a different value for each data record 700 maintained within distributed database 600, which uniquely identifies a particular data record 700 from all other data records 700. The illustrated embodiment of replication field 745 contains data indicating the extent (or lack thereof) to which data record 700 should be replicated throughout distributed database 600 by replication clients 420. Replication field 745 provides a mechanism to partition data records 515 into subsets to enable selective replication throughout distributed database 600.

For example, replication field 745 may include a two-bit field capable of encoding four replication choices. Replication field 745 may indicate that data record 700 is to remain local to a client process within its process memory region (e.g., "00"), remain local to a processing node, but replicated into one or more shared memories 410 within a given processing node (e.g., "01"), be replicated to specified processing modules 400 within network service element 200 (e.g., "10"), or be fully replicated to all processing modules 400 within network service element 200. In the event replication field 745 designates partial replication (e.g., "10"), then replication field 745 may include additional space for designating to which processing modules 400 data record 700 is to be replicated. In one embodiment, replication is carried out independently by replication clients 420, while the client processes set replication field 745 to indicate their replication preference.

User data 720 is the payload portion of data record 700 for storing the useful data itself. User data 720 may contain one or more subfields (e.g., F1 to FN), which include declared variables with set field values (e.g., variable="Sally's phone number"; field value="1-604-247-XXXX").

The illustrated embodiment of pointer fields 725 include reserved fields at the bottom of base portion 705 for storing pointers or links to one or more add-on portions 710. Unused fields within pointer fields 725 may be initialized to a NULL value, and subsequently replaced with a pointer to a new add-on portion 710 as they are added. Pointer fields 725 provide a mechanism to extend the amount of user data that may be stored in a single data record 700, while at the same time using fixed size memory structures. By fixing the size of base portion 705 and each add-on portion 710, these memory structures can be quickly and easily manipulated and copied. Accordingly, the illustrated embodiment of data record 700 is well suited for use in runtime database 330 where speed is premium. However, since data record 700 is extendable (all be it in increments equal to each add-on portion), a minimum useful size may be selected for base portion 705 for efficient memory use. In this manner, the extendable format of data record 700 is also well suited for use in provisioning database 325 where memory is a premium.

Returning to FIG. 5, not only may each client process maintain its own organizational structure for data records 515, but it may also reference data records 515 using different keys. As previously mentioned, each node (e.g., nodes N1-21) includes a key(s) for accessing its associated data record 515 in shared memory region 510. In one embodiment, this key may include either global ID 740 or one or more field values associated with subfields F1-FN. Accordingly, client process CP1 may link to one of data records 515 by referencing field values associated with subfields F1 and F2, while client process CP2 links to the same data record 515 by referencing field values associated with subfields F3 and FN, while client process CP3 links to the same data record 515 by referencing global ID 740. Of course, in order to uniquely identify a particular data record 515 within shared memory region 510, the combination of subfields referenced within user data 720 should uniquely identify that data record from all other data records. As mentioned above, each client process CP1, CP2, or CP3 may use multiple ADS 505 for accessing shared memory region 510. In one embodiment, one or more of the client processes may include a primary ADS 505 that references data records 515 with one set of field values and a secondary ADS 505 that references data records 515 with another set of field values.

Figure 8A:
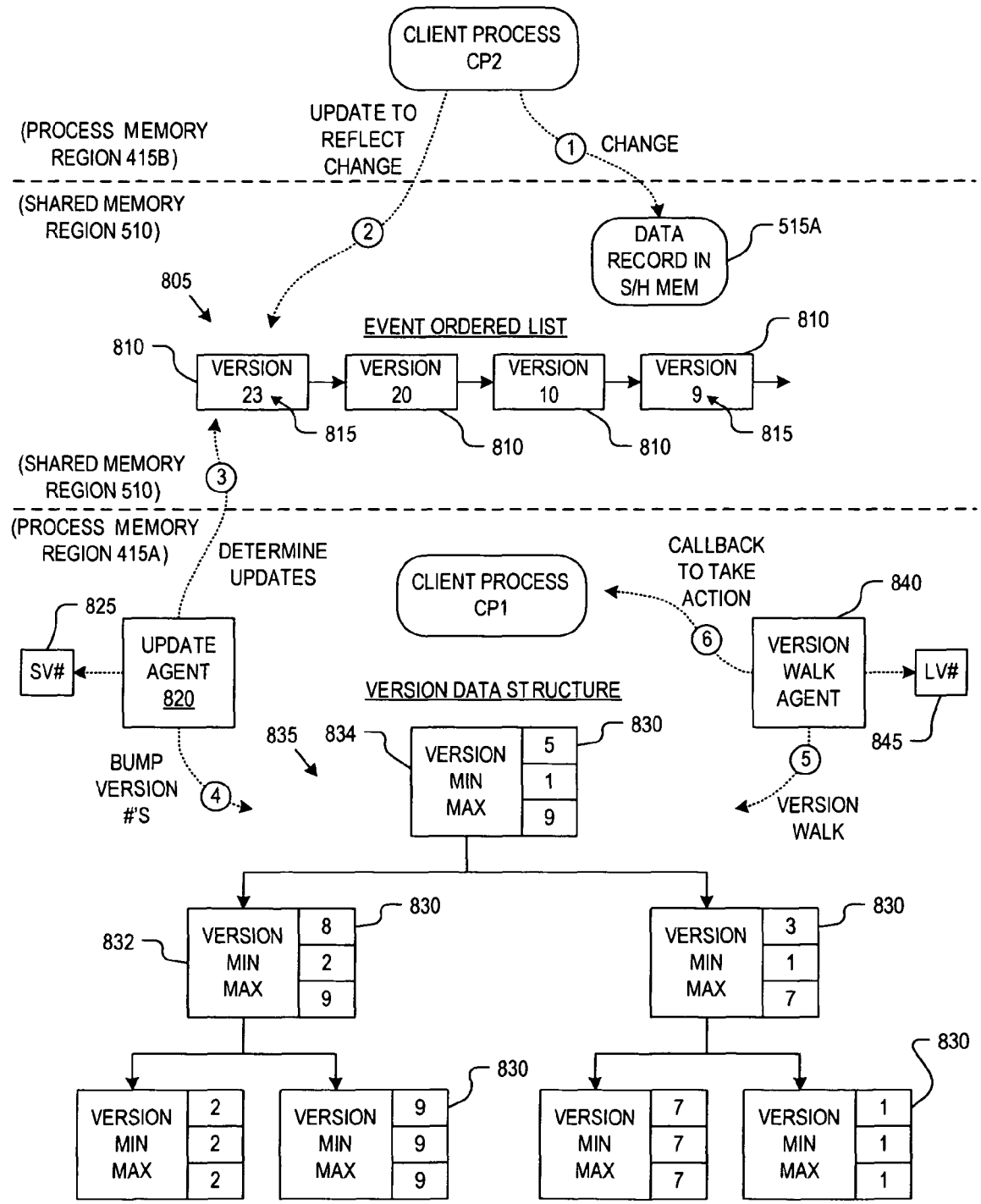
FIG. 8A is a functional block diagram illustrating how data coherency is maintained between shared memory and client processes, in accordance with an embodiment of the invention.
Figure 8B:
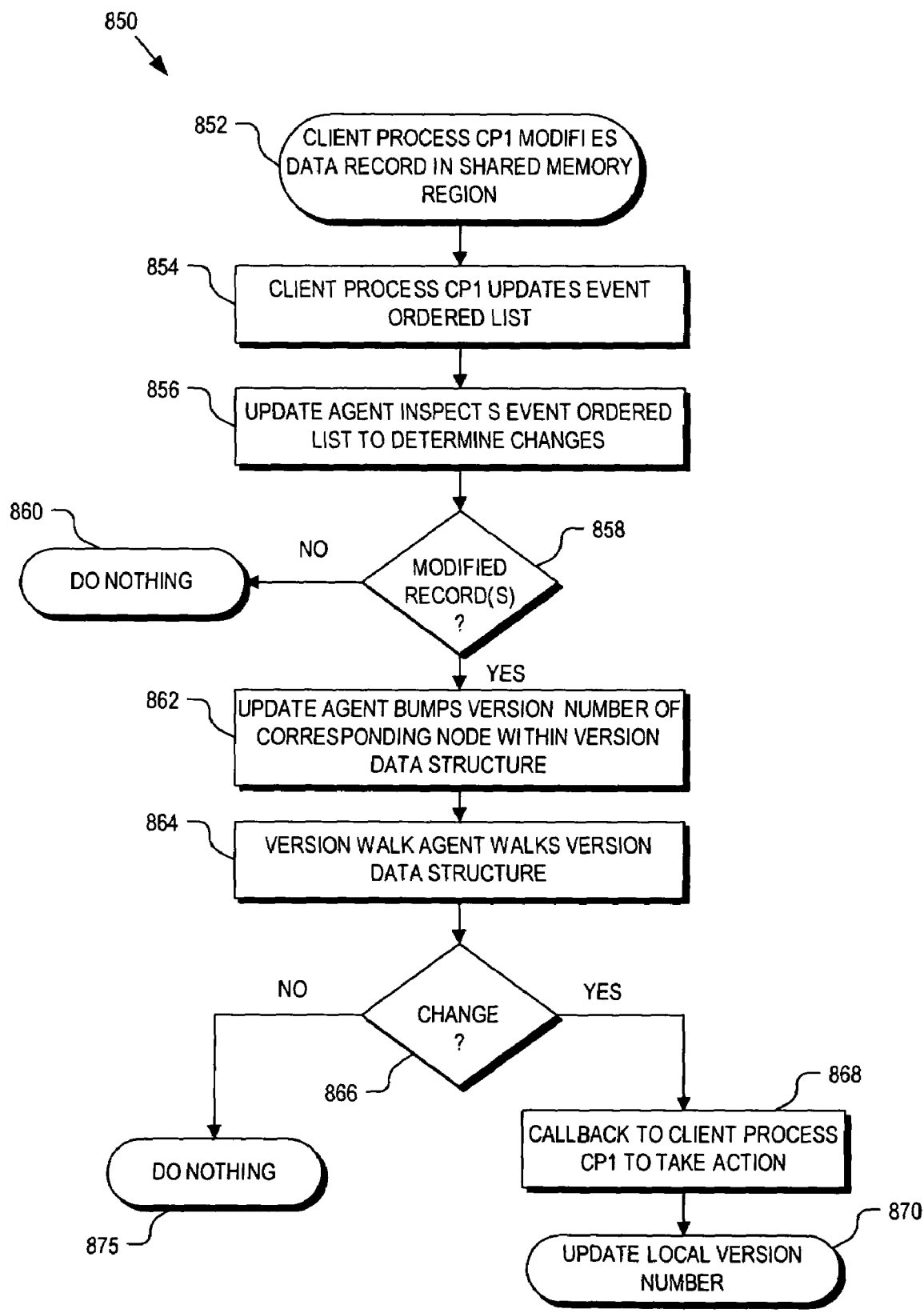
FIG. 8B is a flow chart illustrating a process for maintaining data coherency between shared memory and client processes, in accordance with an embodiment of the invention.

FIG. 8A is a functional block diagram illustrating how data coherency is maintained between shared memory regions 410 and process memory regions 415, while FIG. 8B is a flow chart illustrating a process 850 for maintaining such coherency, in accordance with an embodiment of the invention. During operation, the client processes may access data records 515 in shared memory region 510 and then perform operations on local data records 520 (e.g., application data) maintained in process memory regions 415. If local data records 520 have dependencies on the values of shared data records 515, then a modification to one or more shared data records 515 may necessitate executing an update on the local data records 520.

The order in which some or all of the process blocks appear in each process should not be deemed limiting. Rather, one of ordinary skill in the art having the benefit of the present disclosure will understand that some of the process blocks may be executed in a variety of orders not illustrated. In a process block 852, client process CP2 modifies data record 515A in shared memory region 510. After modifying data record 515A, client process CP2 updates event ordered list 805 (process block 854). In one embodiment, event ordered list 805 is a link list data structure maintained in shared memory region 510 to track the chronological order in which each data records 515 are modified within shared memory region 510. Each time a particular data record 515 is updated, its corresponding version element 810 is bumped to the head of event ordered list 805, and a version number 815 associated with the version element 810 assumes a value of the current version number incremented by one. If the same data record 515 is modified multiple times in a row, then its version element 810 remains at the head of event ordered list 805, but its version number 815 is incremented by one. Of course, version numbers 815 may wrap back to zero after reaching a maximum value. Accordingly, the version element 810 at the head of event ordered list 805 corresponds to data record 515A, since data record 515A is the most recently changed record.

In a process block 856, an update agent 820 inspects event ordered list 805 and determines whether any changes have occurred to data records 515 within shared memory region 510 since its last inspection. Update agent 820 is an entity that resides within process memory region 415A of client process CP1. Update agent 820 may inspect event ordered list 805 on a periodic basis or in response to a prompt from client process CP1. It should be appreciated that each client process may include its own update agent 820 to maintain coherency with shared memory region 510.

In one embodiment, update agent 820 determines that a change has occurred since its last inspection by comparing the highest version number 815 within event ordered list 805 against its shared version number 825. Update agent 820 maintains shared version number 825 as a record of the last version number 815 up to which it has inspected. If no changes have occurred since the last inspection (decision block 858), then update agent 820 does nothing (process block 860). However, if the highest version number 815 within event ordered list 805 is greater than shared version number 825, then process 850 continues to a process block 862.

In process block 862, update agent 820 bumps version numbers 830 within version data structure 835. Version data structure 835 maintains version information for client process CP1. Version data structure 835 is a tree structure of nodes, where each node corresponds to a node within ADS 505A. When update agent 820 bumps version numbers 830, it only bumps the version number 830 of the node associated with data record 515A and then adjusts the MAX numbers of above nodes to reflect this new version number 830. For example if data record 515A corresponds to node 832, then version number 830 of node 832 would be increased to 10, and the MAX number of node 834 would also be increased to 10, as well.

In a process block 864, a version walk agent 840 walks version data structure 835 to determine if any changes have occurred. In one embodiment, version walk agent 840 is maintained in process memory region 415A of client process CP1. Version walk agent 840 determines whether any changes have occurred (decision block 866) by walking version data structure 835 and comparing version numbers 830 against a local version number 845. If local version number 845 falls within the MIN/MAX range of a branch within version data structure 835, then version walk agent 840 will walk that branch to determine which node has a version number 830 greater than local version number 845. Once the updated node is identified, version walk agent 840 executes a callback (process block 868) to notify client process CP1 to re-execute appropriate code to reflect the changed data record 515A. Finally, in a process block 870, version walk agent 840 increments local version number 845. Returning to decision block 866, if version walk agent 840 determines no changes have occurred, then no action is taken in a process block 875.

It should be appreciated that update agent 820 and version walk agent 840 may be implemented as independent execution threads within client process CP1. Therefore, their operations may be executed in parallel along with operation of client process CP1.

Figure 9A:
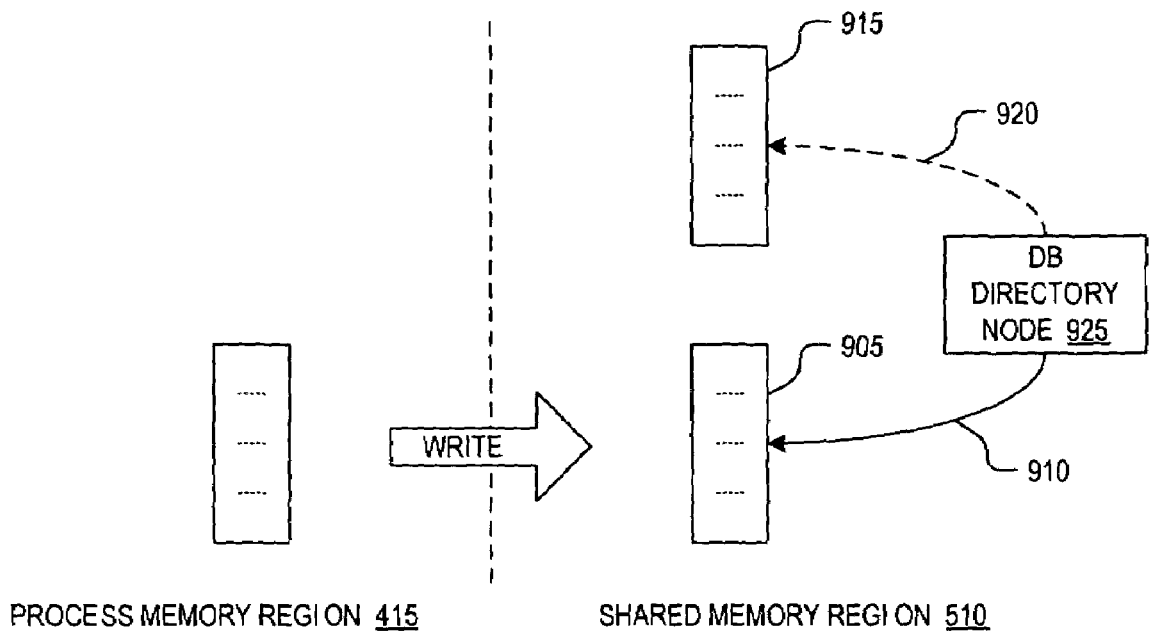
FIG. 9A is a block diagram illustrating an atomic write into a shared memory region, in accordance with an embodiment of the invention.
Figure 9B:
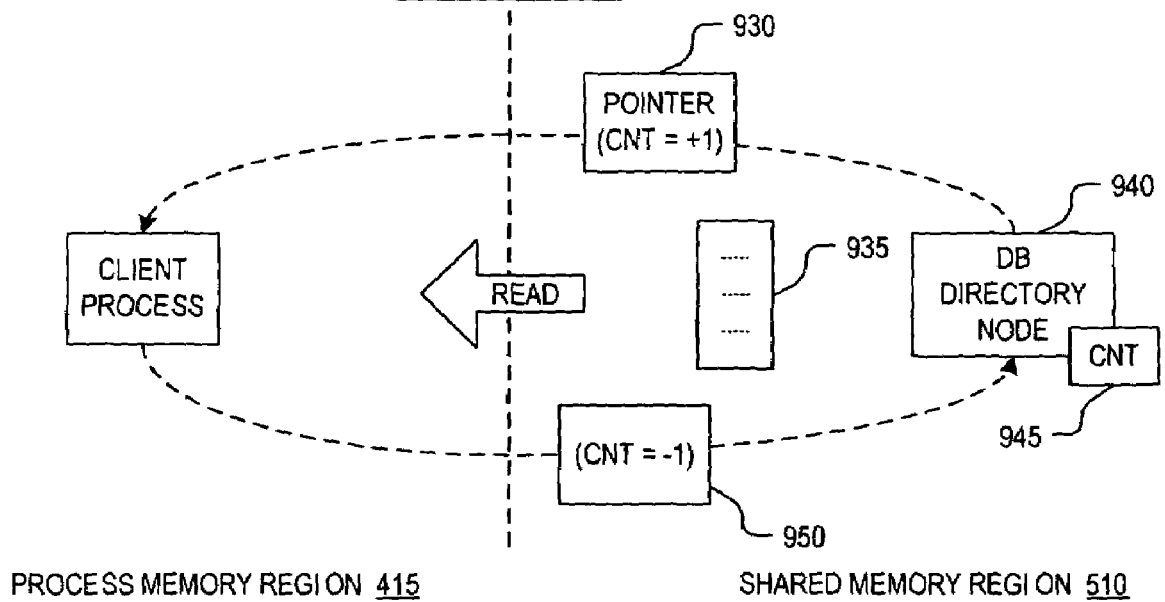
FIG. 9B is a block diagram illustrating a zero-copy read from a shared memory region, in accordance with an embodiment of the invention.

FIGS. 9A and 9B illustrate techniques for providing shared access to database 600 while preventing corruption of data records 515. Since data records 515 may be shared by multiple client processes, it is important to protect database 600 from corruption due to false sharing, interrupted writes, or otherwise. In one embodiment, writes into shared memory region 510 are atomic. An atomic write is a write where data is either entirely written or not written at all. FIG. 9A is a block diagram illustrating an atomic write into shared memory region 510. When writing into shared memory region 510, a chunk 905 of shared memory region 510 is allocated and the client process writes its data into chunk 905. Subsequently, the client process signals to database 600 that the write is complete and a pointer 910 from within the database directory is updated to reference chunk 905.

In one embodiment, database 600 maintains a directory structure (e.g., database tree structure) to organize internal links to all data records 515 within shared memory region 510. The directory structure may include a database directory node (e.g., database directory node 925) associated with each data record 510, which maintains a pointer to its associated data record 515, as well as, other internal data. Accordingly updating pointer 910 may include updating database directory node 925.

In one embodiment, if the write is to replace or modify an existing data record 915, the database directory will have a pre-existing pointer 920 referencing the existing data record 915. Once the client process has written into chunk 905, database directory node 925 is updated with the new pointer 910 referencing chunk 905 and the memory consumed by existing data record 915 is released and reclaimed.

In one embodiment, if the client process is inserting a new data record, a buffer or memory chunk may be allocated by the client process, populated, and then passed into database 600. This provides for a zero-copy insertion, since insertion is effected by updating pointers, and a one copy write when the allocated memory chunk is populated.

FIG. 9B is a block diagram illustrating a zero-copy read from shared memory region 510. In this zero-copy read embodiment, a pointer 930 to a requested data record 935 is passed out to the client process. With pointer 930 in hand, the client process can read the variables/data it needs directly from shared memory region 510. At the same time as passing out pointer 930, a database directory node 940 associated with data record 935 increments a count 945. When the client process is finished with data record 935, it notifies database directory node 940 to this effect and database directory node 940 decrements count 945, as illustrated by block 950. All valid data records start with a default count value of +1. If a pointer is passed out to a client process for reading the data record, its count value is incremented to +2. When the client process is finished reading, its count value is decremented back to +1. When a data record is to be deleted or re-written, its count value is decremented to 0, at which point the database deletes the record and reclaims the memory. Accordingly, if a data record is being read by client process CP1, during which client process CP2 deletes the data record, its count value will not reach zero until after the read by client process CP1 is finished and therefore the data record will not be deleted by the database until after the read is complete. Of course, it should be appreciated that other default count values and other delete count values other than 1 and 0, respectively, may be implemented.

In one embodiment, database 600 may implement a one-copy read as follows. First, the database allocates a chunk of shared memory region 501 and copies an original data record into the allocated chunk to create a copied data record. At the same time, database 600 places a lock on the original data record so it cannot be modified. Next, database 600 passes a pointer to the copied data record. The one-copy read protects the original data record from the client process, since the client process only receives access to the copied data record.

Figure 10:
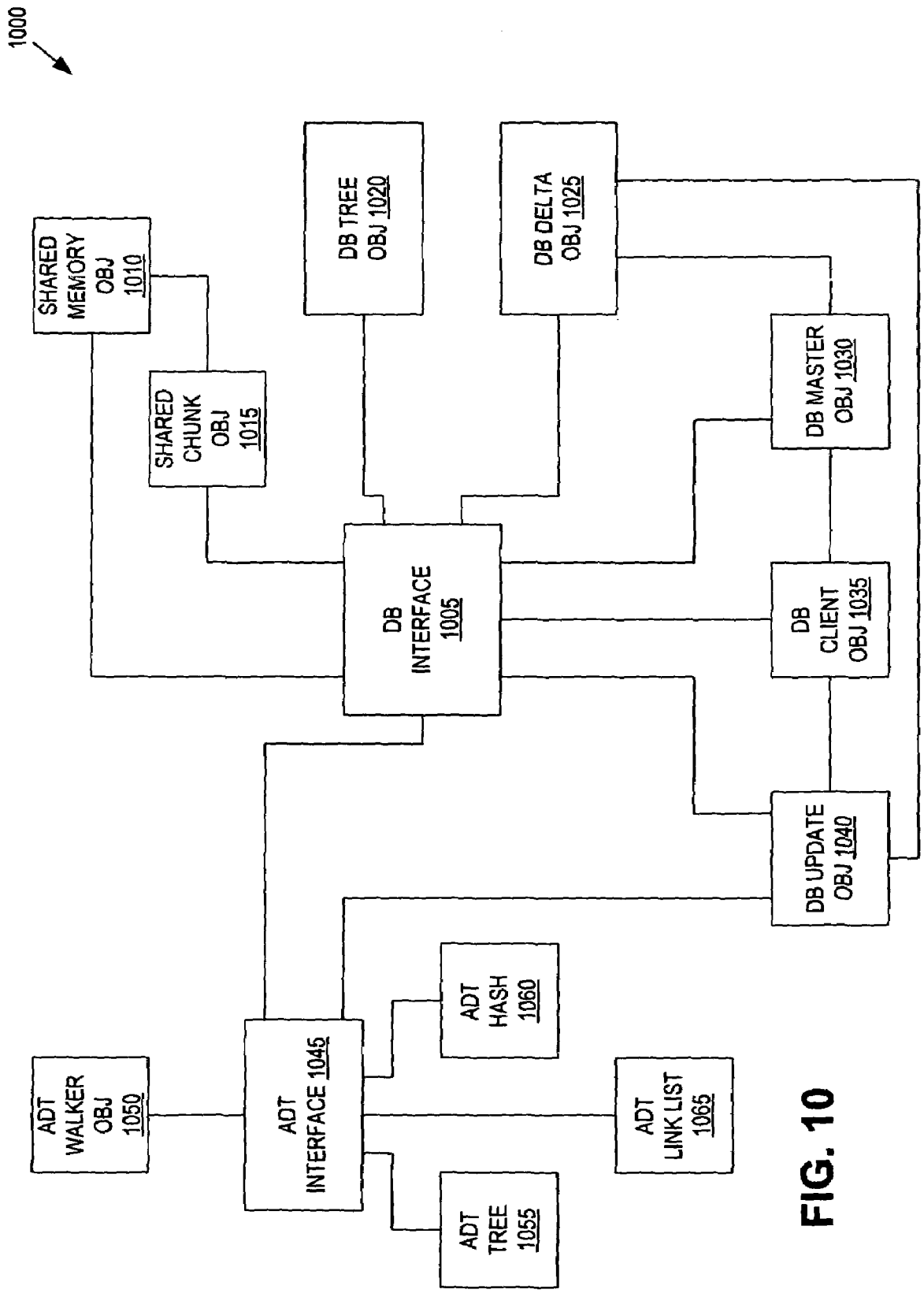
FIG. 10 is a functional block diagram illustrating an example software architecture for generating a distributed database, in accordance with an embodiment of the invention.

FIG. 10 is a functional block diagram illustrating an example software architecture 1000 for generating distributed database 600, in accordance with an embodiment of the invention. The illustrated embodiment of software architecture 1000 includes a database ("DB") interface 1005, a shared memory object 1010, a shared chunk object 1015, a DB tree object 1020, a DB delta object 1025, a DB master object 1030, a DB client object 1035, a DB update object 1040, an abstract data type ("ADT") interface 1045, an ADT walker object 1050, and one of an ADT tree 1055, an ADT hash 1060, or an ADT link list 1065. The components of software architecture 1000 represent the software entities that may be instantiated in each process memory region 415 to enable each client process to join distributed database 600.

DB interface 1005 links to the various other subcomponents of software architecture 1000 and operates as the entry point for a client process to gain access into distributed database 600. Shared memory object 1010 enables one or more client processes to use the resources of shared memory region 510. Shared memory object 1010 assigns and/or frees chunks of shared memory to the requesting client process and may perform miscellaneous memory management tasks. Shared memory object 1010 obtains these chunks of shared memory from shared chunk object 1015, which pre-allocated fixed sized chunks for future use. Since multiple concurrent accesses to shared memory object 1010 could result in memory thrashing, shared chunk object 1015 pre-allocates fixed sized chunks of memory for better performance.

DB tree object 1020 links to a tree structure maintained in shared memory region 510. This tree structure is used to internally organize data records 515 keyed to global IDs 740. Nodes are added and removed to this tree structure as client processes add and remove data records 515 from shared memory region 510.

DB delta object 1025 is the object in process memory region 415 that provides access to event ordered list 805 maintained in shared memory region 510. DB delta object 1025 performs updates and applies changes to process memory region 415.

DB master object 1030 is in charge of administering the local shared memory region 510 of distributed database 600, cleaning up event ordered list 805, and freeing any resources when a process client disconnects. Each client process instantiates its own DB master object; however, only one such object operates as the master at a given time.

DB client object 1035 maintains client information for every client process that links to shared memory region 510. This client information includes the current version number 815 up to which each client process has read and updated itself. If the instant client process is the master, and therefore, its DB master object 1030 is active, then DB master object 1030 will refer to DB client object 1035 to determine up to what version number all client process have read and therefore up to which version number DB master object 1030 can perform cleanup duties.

ADT interface 1045 performs the actual updates on the local ADS 505, performs read/write/remove operations on ADS 505, and bumps version numbers 830 on version data structure 835. In one embodiment, ADT interface 1045 includes the functionality of update agent 820. DB update object 1040 is a thread class that is in charge of reading event ordered list 805 via invoking DB delta object 1025, determines the current shared version number 825 of the client process, and calls DB delta object 1025 to update by passing ADT interface 1045 into DB delta object 1025. One of ADT tree 1055, ADT hash 1060, or ADT link list 1065 may be linked to ADT interface 1045 at a time and represent ADS 505A, 505B, or 505C, respectively. ADT walker object 1050 performs the version walk described above in connection with version walk agent 840. It should be appreciated that software architecture 1000 is only one possible embodiment of a software architecture capable of implementing the functionality described above.

Figure 11:
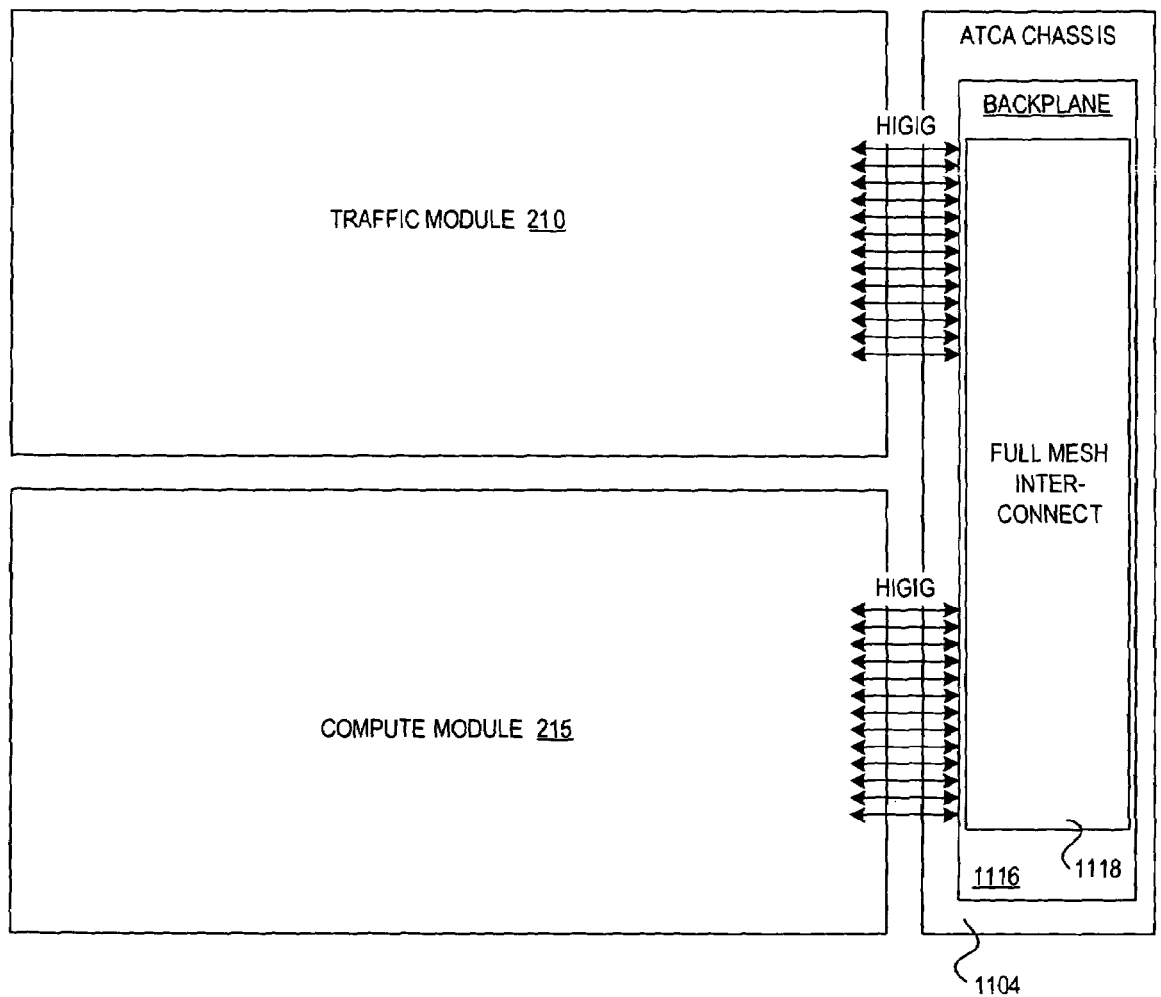
FIG. 11 is a block diagram illustrating interconnections between traffic modules and compute modules of a network service node, in accordance with an embodiment of the invention.

In accordance with architecture aspects of some embodiments, the aforementioned functions may be facilitated by various processing and storage resources hosted by associated line cards and the like, which are mounted in a common chassis. As shown in FIG. 11, from a datapath perspective, the hardware architecture of one embodiment of network service node 200 can be decomposed into three entities, traffic modules (TM) 210, compute modules (CM) 215 and the chassis 1104. In one embodiment, a CM can be further re-defined to be an OAMP module based on its slot index (within chassis 1104). OAMP modules are a functional superset of CMs, adding operations, administration, maintenance, and provisioning functionality (collectively referred to as OAMP card function or OAMP CF).

As illustrated in the embodiments herein, chassis 1104 comprises an Advanced Telecommunication and Computing Architecture (ATCA or AdvancedTCA®) chassis. The ATCA Chassis provides physical connectivity between the modules via a passive backplane 1116 including a full-mesh interconnect 1118. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

The ATCA 3.0 base specification (approved Dec. 30, 2002), which is being carried out by the PCI Industrial Computer Manufacturers Group ("PICMG"), defines the physical and electrical characteristics of an off-the-shelf, modular chassis based on switch fabric connections between hot-swappable modules or blades. (As used herein, the terms "board," "blade," and "card," are interchangeable.) This specification defines the frame (rack) and shelf (chassis) form factors, core backplane fabric connectivity, power, cooling, management interfaces, and the electromechanical specification of the ATCA-compliant boards.

Figure 12:
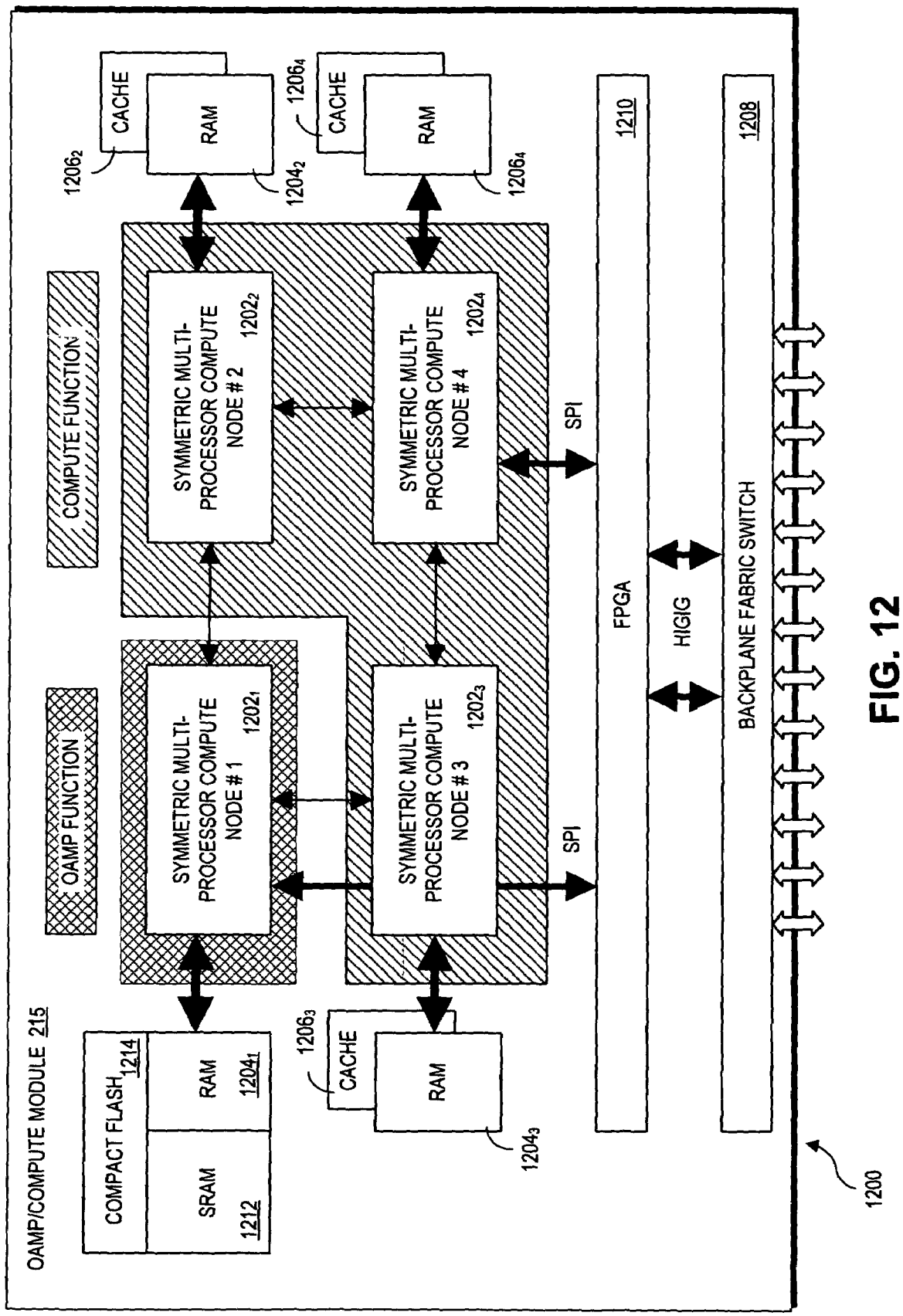
FIG. 12 is a block diagram illustrating a compute module, in accordance with an embodiment of the invention.

An exemplary architecture 1200 for a compute module 215 is shown in FIG. 12. In one embodiment, a single compute module (physical) architecture is employed for both Compute Blades and OAMP CF's. More particularly, under architecture 1200, a corresponding module may be deployed to support both Compute and OAMP functionality.

Compute module 215 employs four multiple processor compute nodes $1202_{1-4}$. In general, each of compute nodes $1202_{1-4}$ functions as multiple processor resources, with each processor resource being associated with a logical processor. Accordingly, such processor resources may be implemented using separate processors, or processor chips employing multiple processor cores. For example, in the illustrated embodiment of FIG. 13, each of compute nodes $1202_{1-4}$ is implemented via an associated symmetric multi-core processor. Exemplary multi-core processors that may be implemented include, but are not limited to Broadcom 1480 and 1280 devices. Each of the compute nodes $1202_{1-4}$ is enabled to communicate with other compute nodes via an appropriate interface (e.g., bus or serial-based interfaces). For the Broadcom 1480 and 1280 devices, this interface comprises a "Hyper Transport" (HT) interface. Other native (standard or proprietary) interfaces between processors may also be employed.

As further depicted in architecture 1200, each compute nodes $1202_{1-4}$ is allocated various memory resources, including respective RAM $1204_{1-4}$. Under various implementations, each of compute nodes $1202_{1-4}$ may also be allocated an external cache $1206_{1-4}$, or may provide one or more levels of cache on-chip. In one embodiment, the RAM comprises ECC (Error Correction Code) RAM. In one embodiment, each compute node employs a NUMA (Non-Uniform Memory Access) cache coherency scheme. Other cache coherency schemes, such as MESI (Modified, Exclusive, Shared, Invalidated), may also be implemented for other embodiments.

Each Compute module 215 includes a means for interfacing with ATCA mesh interconnect 1118. In the illustrated embodiment of FIG. 12, this is facilitated by a Backplane Fabric Switch 1208. Meanwhile, a field programmable gate array ("FPGA") 1210 containing appropriate programmed logic is used as an intermediary component to enable each of compute nodes $1202_{1-4}$ to access backplane fabric switch 1208 using native interfaces for each of the compute nodes and the fabric switch. In the illustrated embodiment, the interface between each of compute nodes $1202_{1-4}$ and the FPGA 1210 comprises an SPI (System Packet Interface) 4.2 interface, while the interface between the FPGA and backplane fabric switch 1208 comprises a Broadcom HiGig™ interface. It is noted that these interfaces are merely exemplary, and that other interface may be employed depending on the native interfaces of the various blade components.

In addition to local RAM (e.g., RAM $1204_1$), the compute node associated with the OAMP function (depicted in FIG. 12 as Compute Node #1) is provided with local SRAM 1212 and a non-volatile store (depicted as Compact flash 1214). The non-volatile store is used to store persistent data used for the OAMP function, such as provisioning information and logs. In Compute modules that do not support the OAMP function, each compute node is provided with local RAM and a local cache.

In the embodiment illustrated in FIG. 12, compute module 215 is provisioned as an OAMP blade. In one configuration (as shown), one of the compute nodes is employed for performing OAMP functions (e.g., compute node $1202_1$), while the other three compute nodes (e.g., compute nodes $1202_{2-4}$)

perform normal compute functions associated with compute blades, as described in further detail below. When a compute module 215 is provisioned as a compute blade, each of compute nodes $1202_{1-4}$ is available for performing the compute functions described herein.

Figure 13:
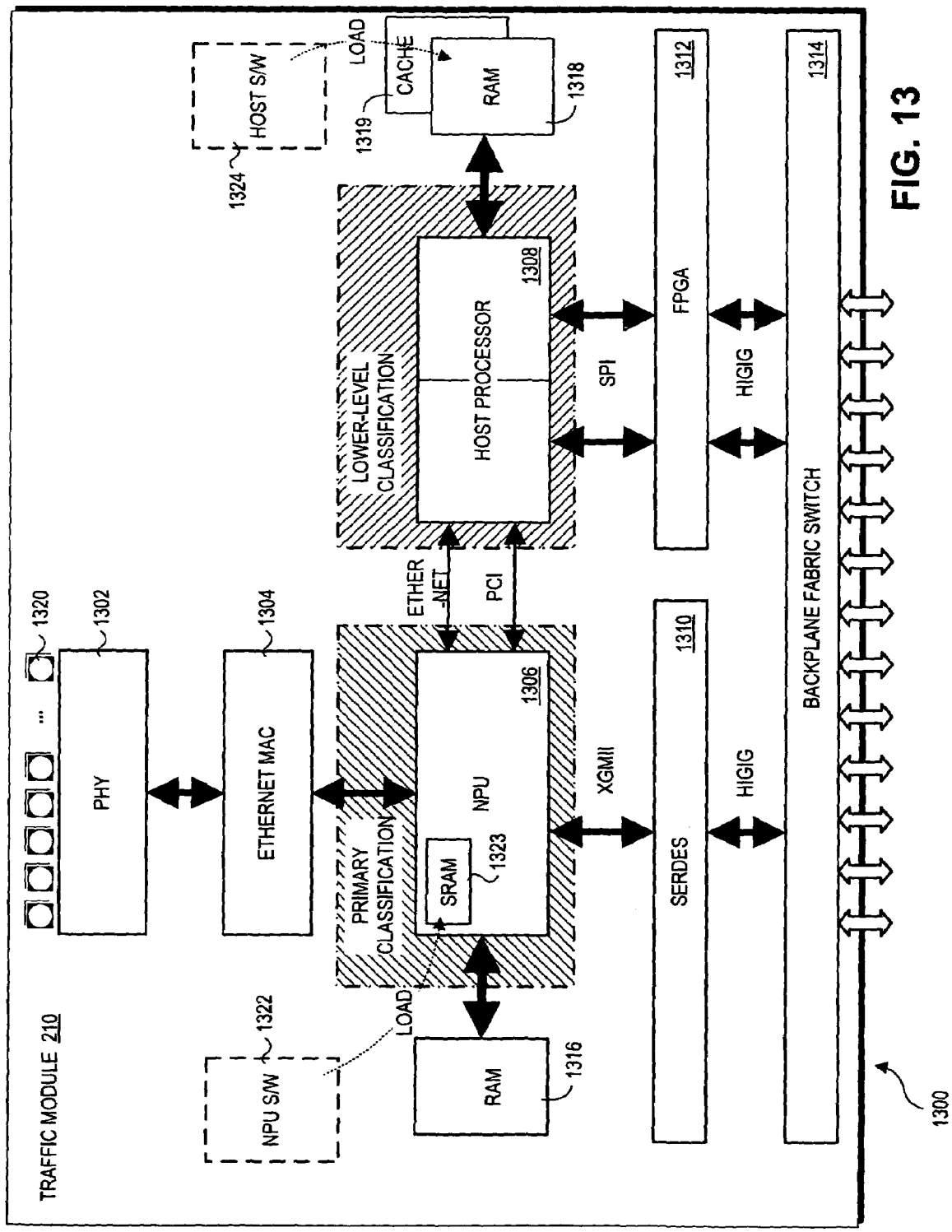
FIG. 13 is a block diagram illustrating a traffic module, in accordance with an embodiment of the invention.

FIG. 13 shows an exemplary architecture 1300 for a traffic module 210. Architecture 1300 includes a PHY block 1302, an Ethernet MAC block 1304, a network processor unit (NPU) 1306, a host processor 1308, a SERDES interface 1310, an FPGA 1312, a backplane fabric switch 1314, RAM 1316 and 1318 and cache 1319. The traffic blade further includes one or more I/O ports 1320, which are operatively coupled to PHY block 1320. Depending on the particular use, the number of I/O ports may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

PHY block 1302 and Ethernet MAC block 1304 respectively perform layer 1 (Physical) and layer 2 (Data Link) functions, which are well-known in the art. In general, the PHY and Ethernet MAC functions may be implemented in hardware via separate components or a single component, or may be implemented in a combination of hardware and software via an embedded processor or the like.

One of the operations performed by a traffic module is packet identification/classification. As discussed above, a multi-level classification hierarchy scheme is implemented for this purpose. Typically, a first level of classification, such as a 5-Tuple signature classification scheme, is performed by the traffic blade's NPU 1306. Additional classification operations in the classification hierarchy may be required to fully classify a packet (e.g., identify an application flow type). In general, these higher-level classification operations may be performed by the traffic blade's host processor 1308 and/or a processor on a compute blade, depending on the particular classification.

NPU 1306 includes various interfaces for communicating with other board components. These include an Ethernet MAC interface, a memory controller (not shown) to access RAM 1316, Ethernet and PCI interfaces to communicate with host processor 1308, and an XGMII interface. SERDES interface 1310 provides the interface between XGMII interface signals and HiGig signals, thus enabling NPU 1306 to communicate with backplane fabric switch 1314. NPU 1306 may also provide additional interfaces to interface with other components, such as an SRAM (Static Random Access Memory) interface unit to interface with off-chip SRAM (both not shown).

Similarly, host processor 1308 includes various interfaces for communicating with other board components. These include the aforementioned Ethernet and PCI interfaces to communicate with NPU 1306, a memory controller (on-chip or off-chip—not shown) to access RAM 1318, and a pair of SPI 4.2 interfaces. FPGA 1312 is employed to as an interface between the SPI 4.2 interface signals and the HiGig interface signals.

Typically, NPUs are designed for performing particular tasks in a very efficient manner. These tasks include packet forwarding and packet classification, among other tasks related to packet processing. To support such functionality, NPU 1306 executes corresponding NPU software 1322. This software is shown in dashed outline to indicate that the software may be stored (persist) on a given traffic blade (e.g., in a flash device or the like), or may be downloaded from an external (to the traffic blade) store during initialization operations, as described below. During run-time execution, NPU software 1322 is loaded into internal SRAM 1323 provided by NPU 1306.

Host processor 1308 is employed for various purposes, including lower-level (in the hierarchy) packet classification, gathering and correlation of flow statistics, and application of traffic profiles. Host processor 1308 may also be employed for other purposes. In general, host processor 1308 will comprise a general-purpose processor or the like, and may include one or more compute cores (as illustrated, in one embodiment a two-core processor is used). As with NPU 1306, the functionality performed by host processor is effected via execution of corresponding software (e.g., machine code and or virtual machine byte code), which is depicted as host software 1324. As before, this software may already reside on a traffic blade, or be loaded during blade initialization.

In one embodiment, host processor 1308 is responsible for initializing and configuring NPU 1306. Under one initialization scheme, host processor 1308 performs network booting via the DHCP (or BOOTP) protocol. During the network boot process, an operating system is loaded into RAM 1318 and is booted. The host processor then configures and initializes NPU 1306 via the PCI interface. Once initialized, NPU 1306 may execute NPU software 1322 on a run-time basis, without the need or use of an operating system.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
   storing data records in a database distributed across a plurality of processing nodes, each of the plurality of processing nodes including:
   a plurality of client processes;
   a different respective process memory region for each of the plurality of client processes of the processing node; and a shared memory region external to the process memory regions and shared by the plurality of client processes, wherein storing the data records includes storing the data records in the shared memory regions of the plurality of processing nodes;

changing a first data record stored in one of the shared memory regions by a first client process;

updating an event ordered list maintained in the one of the shared memory regions in response to changing the first data record, wherein the event ordered list represents an order of changes to the data records in the shared memory regions;

incrementing a shared version number used to number elements in the event ordered list; and for each of the plurality of processing nodes:
  linking the plurality of client processes to the database; and
  storing a different respective data structure in each respective process memory region for the plurality of client processes of the processing node, wherein each stored data structure organizes links to one or more of the stored data records, wherein the links determine a scope for the respective client process, and wherein the scope defines to which of the stored data records the respective client process has access.

2. The method of claim 1, wherein the data records outside of the scope for a particular client process is hidden from the particular client process.

3. The method of claim 1, wherein a first data structure residing within a first process memory region associated with a first client process has a different hierarchical structure than a second data structure residing within a second process memory region associated with a second client process, and wherein the scope of the first client process is different than the scope of the second client process.

4. The method of claim 3, wherein the first and second data structures each comprise one of a tree structure, a hash table structure, or a linked list structure.

5. The method of claim 3, wherein the first and second data structures comprise node structures and wherein each node of the node structures includes a key for identifying and retrieving one of the data records from one of the shared memory regions of the database.

6. The method of claim 5, wherein the data records within the database are identifiable by global identifiers or by subfields within user data stored by each of the data records.

7. The method of claim 5, wherein one of the data records is within the scope of both the first and second client process and wherein the first client process links to the one of the data records with a first key referencing a first subfield within the user data while the second client process links to the one of the data records with a second key different from the first key referencing a second subfield within the user data.

8. The method of claim 1, wherein updating the event ordered list maintained in the one of the shared memory regions comprises updating the event ordered list by the first client process.

9. The method of claim 1, further comprising:
  determining at a second client process that the first data record has changed by inspecting the event ordered list;
  updating a version data structure associated with the second client process;
  walking the version data structure to determine which of the data records falling within the scope of the second client process have changed; and
  invoking the second client process to execute code to reflect the change to the first data record.

10. The method of claim 9, wherein updating the version data structure comprises incrementing a local version number of a node within the version data structure, the node associated with the first data record.

11. The method of claim 1, wherein one or more of the data records stored in the database include a base portion and add-on portions linked to the base portion, the base portion including a record header for identification, user data, and links to the add-on portions, the add-on portions including additional user data.

12. The method of claim 1, the method further comprising:
  partitioning the data records into subsets; and
  selectively replicating one or more of the subsets to one or more processing nodes.

13. The method of claim 12, wherein:
  partitioning the data records into subsets comprises specifying whether each data record is to be replicated to multiple shared memory regions within the database by setting a replication field within each of the data records, and
  selectively replicating one or more of the subsets comprises selectively replicating the data records to the multiple shared memory regions according to the replication field of each of the data records.

14. The method of claim 13, further comprising:
  specifying whether each data record is to be maintained local to a process in a process memory, local to a processing node in a shared memory of the processing node, partially replicated to a subset of processing blades of a system, or fully replicated to all processing blades of the system by setting the replication field within each of the data records.

15. A machine-accessible storage medium that provides instructions that, if executed by a machine, will cause the machine to perform operations comprising:
  storing data records in a database distributed across a plurality of processing nodes, each of the plurality of processing nodes including:
    a plurality of client processes;
    a different respective process memory region for each of the plurality of client processes of the processing node; and
    a shared memory region external to the process memory regions and shared by the plurality of client processes,
  wherein storing the data records includes storing the data records in the shared memory regions of the plurality of processing nodes;
  changing a first data record stored in one of the shared memory regions by a first client process;
  updating an event ordered list maintained in the one of the shared memory regions in response to changing the first data record, wherein the event ordered list represents an order of changes to the data records in the shared memory regions;
  incrementing a shared version number used to number elements in the event ordered list; and
  for each of the plurality of processing nodes:
    linking the plurality of client processes; and
    storing a different respective data structure in each respective process memory region for the plurality of client processes of the processing node, wherein each stored data structure organizes links to one or more of the stored data records, wherein the links determine a scope for the respective client process, and wherein the scope defines to which of the stored data records the respective client process has access.

16. The machine-accessible storage medium of claim 15, wherein a first data structure residing within a first process memory region associated with a first client process has a different hierarchical structure than a second data structure residing within a second process memory region associated with a second client process, and wherein the scope of the first client process is different than the scope of the second client process.

17. The machine-accessible storage medium of claim 16, wherein the first and second data structures comprise node structures and wherein each node of the node structures includes a key for identifying and retrieving one of the data records from one of the shared memory regions of the database.

18. The machine-accessible storage medium of claim 17, wherein one of the data records is within the scope of both the first and second client process and wherein the first client process links to the one of the data records with a first key referencing a first subfield within user data while the second client process links to the one of the data records with a second key different from the first key referencing a second subfield within the user data.

19. The machine-accessible storage medium of claim 15, further providing instructions that, if executed by the machine, will cause the machine to perform further operations, comprising:
  determining at a second client process that the first data record has changed by inspecting the event ordered list;
  updating a version data structure associated with the second client process;
  walking the version data structure to determine which of the data records falling within the scope of the second client process have changed; and
  invoking the second client process to execute code to reflect the change to the first data record.

20. The machine-accessible storage medium of claim 19, wherein updating the version data structure comprises incrementing a local version number of a node within the version data structure, the node associated with the first data record.

21. The machine-accessible storage medium of claim 15, wherein one or more of the data records stored in the database include a base portion and add-on portions linked to the base portion, the base portion including a record header for identification, user data, and links to the add-on portions, the add-on portions including additional user data.

22. The machine-accessible storage medium of claim 15, further providing instructions that, if executed by the machine, will cause the machine to perform further operations, comprising:
  generating a plurality of shared memory regions in which to store the data records;
  linking a replication client to each of the shared memory regions;
  setting a replication field within each of the data records; and
  selectively replicating one or more of the data records to one or more of the shared memory regions based on the replication fields of the data records.

23. The machine-accessible storage medium of claim 15, further providing instructions that, if executed by the machine, will cause the machine to perform further operations, comprising:
  maintaining a count associated with each of the data records in the database;
  incrementing the count of a particular data record when a read of the particular data record is requested;
  passing a pointer to the particular data record in the database to a requesting client process; and
  decrementing the count when the requesting client process finishes reading the particular data record.

24. The machine-accessible storage medium of claim of claim 23, further providing instructions that, if executed by the machine, will cause the machine to perform further operations, comprising:
  decrementing the count when the requesting client process indicates that the particular data record is to be deleted; and
  deleting the particular data record when the count reaches a delete value.

25. A system, comprising:
  a plurality of processing nodes, each of the plurality of processing nodes including:
    a plurality of client processes;
    a different respective process memory region for each of the plurality of client processes of the processing node; and
    a shared memory region external to the process memory regions and shared by the plurality of client processes; and
  software components distributed across the processing nodes, the software components to execute on the processing nodes to perform operations including:
  storing data records in a database distributed across the plurality of processing nodes, wherein storing the data records includes storing the data records in the shared memory regions of the plurality of processing nodes;
  changing a first data record stored in a first shared memory region by a first client process;
  updating an event ordered list maintained in the first shared memory region in response to changing the first data record, wherein the event ordered list represents an order of changes to the data records in the first shared memory region;
  incrementing a shared version number used to number elements in the event ordered list; and
  for each of the plurality of processing nodes:
    linking the plurality of client processes to the database; and
    storing a different respective data structure in each respective process memory region for the plurality of client processes of the processing node, wherein each stored data structure organizes links to one or more of the stored data records, wherein the links determine a scope for the respective client process, and wherein the scope defines to which of the stored data records the respective client process has access.

26. The system of claim 25, wherein a first data structure residing within a first process memory region associated with a first client process has a different hierarchical structure than a second abstract data structure residing within a second process memory region associated with a second client process, and wherein the scope of the first client process is different than the scope of the second client process.

27. The system of claim 26, wherein the first and second data structures comprise node structures and wherein each node of the node structures include a key for identifying and retrieving one of the data records from the first shared memory region.

28. The system of claim 27, wherein one of the data records is within the scope of both the first and second client process, wherein the software components include additional components to execute on the processing nodes to perform additional operations including:
   linking the first client process links to the one of the data records with a first key referencing a first subfield within user data; and
   linking the second client process to the one of the data records with a second key different from the first key referencing a second subfield within the user data.

29. The system of claim 25, wherein the software components include additional components to execute on the processing nodes to perform additional operations including:
   determining at a second client process that the first data record has changed by inspecting the event ordered list;
   updating a version data structure associated with the second client process;
   walking the version data structure to determine which of the data records falling within the scope of the second client process have changed; and
   invoking the second client process to execute code to reflect the change to the first data record.

30. The system of claim 29, wherein updating the version data structure comprises incrementing a local version number of a node within the version data structure, the node associated with the first data record.

31. The system of claim 25, wherein one or more of the data records stored in the database include a base portion and add-on portions linked to the base portion, the base portion including a record header for identification, user data, and links to the add-on portions, the add-on portions including additional user data.

32. The system of claim 25, wherein the software components include additional components to execute on the processing nodes to perform additional operations including:
   linking a replication client to each of the shared memory regions;
   setting a replication field within each of the data records; and
   selectively replicating one or more of the data records to one or more of the shared memory regions based on the replication fields of the data records.

* * * * *